United States Patent
Kammler

[11] Patent Number: 5,191,750
[45] Date of Patent: Mar. 9, 1993

[54] APPARATUS FOR THE FORMING, FILLING AND CLOSING OF BAGS MADE FROM A HEAT-SEALABLE SHEET

[75] Inventor: Roman Kammler, Worms, Fed. Rep. of Germany

[73] Assignee: Rovema Verpackungsmaschinen GmbH, Fernwald-Annerod, Fed. Rep. of Germany

[21] Appl. No.: 761,787

[22] PCT Filed: Feb. 18, 1991

[86] PCT No.: PCT/DE91/00122
§ 371 Date: Sep. 23, 1991
§ 102(e) Date: Sep. 23, 1991

[87] PCT Pub. No.: WO91/12177
PCT Pub. Date: Aug. 22, 1991

[30] Foreign Application Priority Data
Feb. 17, 1990 [DE] Fed. Rep. of Germany ....... 4005078

[51] Int. Cl.$^5$ .................. B65B 51/30; B65B 9/08
[52] U.S. Cl. ................... 53/551; 53/374.5; 53/374.6; 156/358
[58] Field of Search ........... 53/374.5, 374.6, 374.7, 53/550, 551, 552, 75; 156/358, 580, 582

[56] References Cited
U.S. PATENT DOCUMENTS

| | | | |
|---|---|---|---|
| 3,057,129 | 10/1962 | Meissner | 53/550 X |
| 3,164,936 | 1/1965 | Löliger | 53/551 X |
| 3,237,371 | 3/1966 | Gerlach | 53/550 X |
| 3,328,936 | 7/1967 | Billeb | 53/550 X |
| 3,738,081 | 6/1973 | Heinzer | 53/550 |
| 3,925,139 | 12/1975 | Simmons | 156/358 |
| 4,063,983 | 12/1977 | Shiverdecker | 53/374.5 X |
| 4,199,919 | 4/1980 | Moscatelli | 53/552 |
| 4,387,547 | 6/1983 | Reil | 53/551 X |
| 4,608,797 | 9/1986 | Shabram, Jr. et al. | 53/550 X |
| 4,713,047 | 12/1987 | Klinkel | 156/358 X |
| 4,750,313 | 6/1988 | Kammler et al. | 53/552 X |

Primary Examiner—Horace M. Culver
Attorney, Agent, or Firm—Flynn, Thiel, Boutell & Tanis

[57] ABSTRACT

An apparatus for the manufacture, filling and closing of bags made of a heat-sealable sheet. Known apparatus use cross-sealing stations in which, caused by the movement of the cross-welding jaws, on the one hand, an adjustment of the welding path is not possible and, on the other hand, the production speed cannot be increased. In order to avoid these disadvantages, the invention provides that the cross-welding jaw is supported on a support which is connected to two parallel guide-bar arrangements, which are pivotal about two parallel axles arranged perpendicularly with respect to the centerline of the tube to define a four-bar mechanism.

14 Claims, 8 Drawing Sheets

APPARATUS FOR THE FORMING, FILLING AND CLOSING OF BAGS MADE FROM A HEAT-SEALABLE SHEET

FIELD OF THE INVENTION

The invention relates to an apparatus for the forming, filling and closing of bags made from a heat-sealable sheet utilizing means to form a tube from the sheet, a fill pipe and a cross-sealing station, which includes at least two cyclically movable cross-sealing jaws arranged on opposite sides of the tube.

BACKGROUND OF THE INVENTION

Many types of such tubular bag machines are known from the state of the art. The basic principle is thereby that a foil strip is guided over a shaping shoulder so that the edges of the foil strip overlap and can be welded to form a tube by means of a longitudinal welding device. The forming shoulder is connected to a fill pipe so that the goods to be packaged can be filled, mostly from above, through the fill pipe into the tube. In order to seal and to close the individual tubular bags, a cross-sealing station exists below the fill pipe, which is equipped with cross-welding jaws transversely movable with respect to the direction of movement of the tubular bag. The cross-welding jaws are moved in cyclical intervals against one another in order to produce in this manner the respective lower and also upper cross weldings of the bag. The cross-welding jaws must be moved since otherwise the respective next bag could not be moved on.

To move the cross-welding jaws, various principle solutions have been developed. One solution is to move the two cross-welding jaws laterally back and forth, namely to shift them translatorically. This solution is disadvantageous because a reversal of the direction of the cross-welding jaws is needed and thus the cycle frequency is limited.

A technically different solution is to support the cross-welding jaws each on a rotatable support, as this has been realized in the apparatus described in DE-PS 22 24 701. A similar solution is also shown in DE-PS 31 41 431. The disadvantage in these rotating sealing jaws is that these can contact one another only for a very short period of time so that the available sealing time is very short. This has the result that these apparatus can be used only in a limited field and do not permit an increase in the production speed.

In order to handle the problem of the relatively short sealing time with the rotatably supported cross-sealing jaws, it has been suggested to guide the jaws in a curved sector, which extends at least partly parallel with respect to the direction of movement of the tubular bag. Such a D-shaped curve is known from DE-PS 22 24 407. It is possible thereby to somewhat increase the sealing time, however, the guiding of the cross-sealing jaws in the D-shaped curve causes considerable accelerations and delays of the cross-welding jaw during one rotation so that relatively high mechanical stresses result. The result in turn is that the production speed cannot be increased as desired and that a relatively high degree of technology is required.

A further, additional disadvantage of the known solutions using rotating cross-sealing jaws is that the cross-sealing station, in particular in the direction of movement of the bag, has relatively large dimensions so that it is not possible with common machine sizes to provide additional apparatus, for example a device for the manufacture of a so-called block base, which permits the tubular bag to be stored in an upright position.

The basic purpose of the invention is to provide an apparatus of the above-mentioned type, which with a simple design and safe operation enables an extension of the sealing time with an increase in the production speed, has small dimensions and the possibility of easily arranging additional apparatus for special bags or special welding procedures.

This purpose is attained according to the invention by the cross-welding jaw being supported on a support which is connected to two parallel guide-bar arrangements, which are pivotal about two parallel axles arranged perpendicularly with respect to the centerline of the tube to define a four-bar mechanism.

The apparatus of the invention is distinguished by a number of significant advantages. Since with the use of the four-bar mechanism the support together with the cross-welding jaw is not tilted relative to the centerline of the tube or rather to the center plane of the cross-welding connections, it is possible to carry out the welding operation during the entire contact operation between the cross-welding jaw and the tubular-bag material. Thus, there is no danger that the cross-welding jaw tilts or is wedged or contacts the tubular-bag material or separates from same at a not desired angle. The cross-welding jaw thus carries out a cross movement relative to the surface of the tubular-bag material. The invention does not need curved sectors or sliding rings so that the apparatus as a whole is significantly simple in design and, compared with existing solutions, is not susceptible to breakdowns. A particular advantage of the solution of the invention is that the cross-welding jaws are moved rotatingly by the four-bar mechanism so that accelerations or delays in the movement of the cross-welding jaw do not occur. It is thus possible to move the cross-welding jaws basically at any desired rotational speed so that significant increases in the production speed are possible.

Furthermore, the invention is not limited to specific welding methods, it is rather possible to use any desired types of welding jaws. A further advantage of the simple design of the direction of movement of the welding jaws is that the feeding of cooling medium is significantly simplified since rotations or tiltings of the cross-welding jaws do not occur and since the space for movement of the cross-welding jaws is relatively freely accessible.

Due to the universal design capability of the cross-welding jaw and due to the fact that the sealing time can be adjusted as desired, the apparatus of the invention is suitable for all commonly used foils. Furthermore, it is favorable that a desired welding-jaw pressure can be adjusted (manually or automatically), for example, by supporting the cross-welding jaw movably or initially tensioned on the support in a manner which will be described in detail hereinafter.

Since the technical design of the apparatus is very simple and since in particular in the area of the cross-welding jaws only the four-bar mechanism is needed, the entire arrangement can have very small dimensions. Thus, it is also possible to use the sealing station of the invention in connection with further supplemental devices, for example with a block-base device.

A particularly favorable further development of the invention provides that the cross-welding jaw is movably supported on the support. The movement of the cross-welding jaw on the support enables the cross-welding jaw to be moved at a sufficient contact pressure against the opposite cross-welding jaw and to be initially tensioned and to adjust a suitable welding path. Thus, a sufficient bearing on the tubular-bag material is assured.

It is furthermore advantageous according to the invention when the support is designed in the form of a plate arranged parallel to the center plane fixed by the centerline of the tube and the cross-welding jaw during the welding operation. The plate-like design of the support, on the one hand, simplifies the support of the cross-welding jaw, on the other hand, it is possible to connect the plate at its upper and lower ends directly to the four-bar mechanism so that only a small number of moved structural parts having a small mass exist.

In order to assure an even sealing pressure and in order to guarantee an even bearing of the cross-welding jaw against the tubular-bag material, the invention provides, as already mentioned, that the cross-welding jaw is movable perpendicularly with respect to the support and can be tensioned initially in direction of the center plane. The initial tension can, for example, be done by means of springs, while the mobility of the cross-welding jaw can be realized by connecting same to bolts supported in guideways on the support plate. It is furthermore, advantageous to measure and manually or automatically adjust the contact pressure through sensors.

It is furthermore particularly advantageous according to the invention that additional structural elements, for example closing and removing elements, can be supported on the support so that in addition a closing and removing operation can be carried out. It is hereby also particularly advantageous that, due to the movement of the support, exact paths of movement of the closing and removing elements are given and the respective time of engagement with the bag material can be adjusted as desired. It is thereby possible for the closing and removing elements, similar to the cross-welding jaw, to be supported also perpendicularly with respect to the support on the support and to be initially tensioned.

It is possible according to the invention to widely vary the four-bar design and to adjust same to the respective needs. Depending on the width of the sealing jaw, which can be changed as desired, it is possible to provide a parallel guide-bar arrangement on both sides of the sealing jaw, namely at the two ends of the support. It is also possible to support the support on an upper parallel guide-bar arrangement and to connect same to the lower parallel guide-bar arrangement only to guide and align the support. It is thus possible to design the support very narrowly and to further reduce the moved masses of the arrangement.

The parallel guide-bar arrangement is driven by providing same with a crank or crank disk, which can, for example, be equipped and can be balanced with balancing weights. A smooth running of the entire arrangement also at high rotational speeds is thus assured. The crank disks can be driven either by operatively connecting them each to a common drive axle or, however, it is also possible to connect only the one crank disk, on which the parallel guide-bar arrangement is mounted and which carries the support, to the drive axle and to operatively connect the other crank disk to the first crank disk. For a smooth running of the entire arrangement it is, of course, particularly favorable when the crank disks are driven at the same angular speed.

In order to adjust according to the invention the removing path and/or the sealing path and to adjust same to the respective requirements, it can be particularly advantageous when the distance of the two axles from the center plane of the tubular bag or the distance of the outer jaw surface from the fulcrum is changed. Thus, a shortening or extending of the path is obtained in dependency of a springy support of the cross-welding jaw, during which, with the cross-welding jaw moving, same rests against the tubular-bag material.

The apparatus of the invention can be advantageously utilized both in horizontally and also vertically operating tubular-bagging machines.

BRIEF DESCRIPTION OF THE DRAWINGS

The invention will be described hereinafter in connection with exemplary embodiments and the drawings, in which.

DETAILED DESCRIPTION

Figure 1:
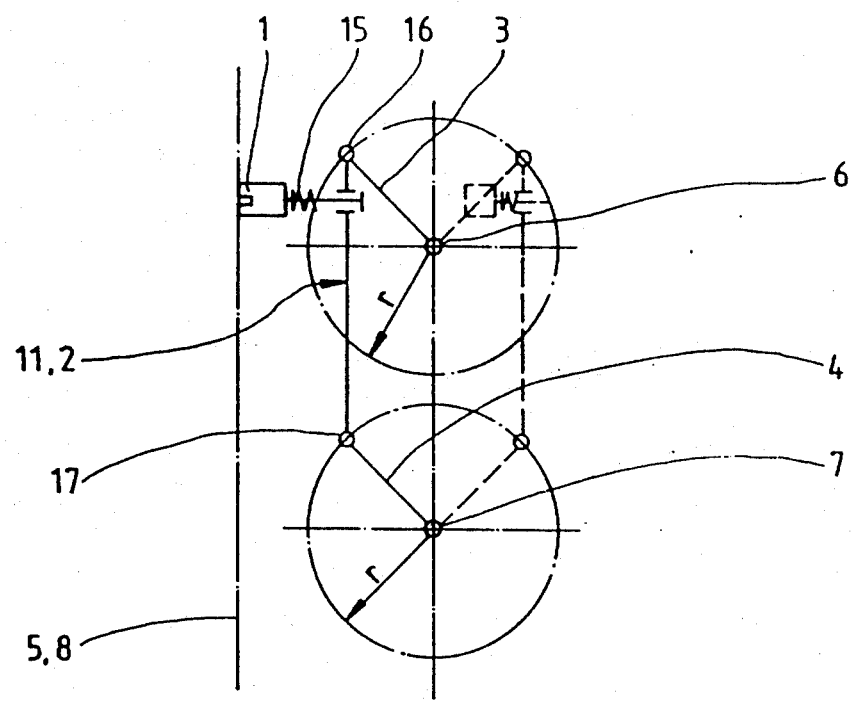
FIG. 1 is a schematic side view of the basic principle of the cross-sealing station of the invention.

FIG. 1 illustrates schematically the cross-sealing station of the invention. The left half of FIG. 1 shows the centerline 5 of the tubular foil or rather the center plane 8 traveled by a cross-sealing jaw 1 and the centerline 5 therefor. The cross-sealing jaw 1 is, as will be discussed in detail in connection with FIG. 5, movably supported on a support 2 and is initially urged away from the support by means of a spring 15. The upper and the lower end of the support 2 are each provided with a joint 16, 17, to which are hinged an upper parallel guide-bar arrangement 3 and a lower parallel guide-bar arrangement 4. These in turn are respectively rotatably supported on an upper axle 6 and a lower axle 7 so that the joint axles of the joints 16 and 17 describe the circular paths described in FIG. 1, when the support 2 is pivotally moved about the axle 6 or 7. The right half of the figure shows in dashes the position of the cross-sealing jaw 1 when it is swivelled to the rear.

Figure 2:
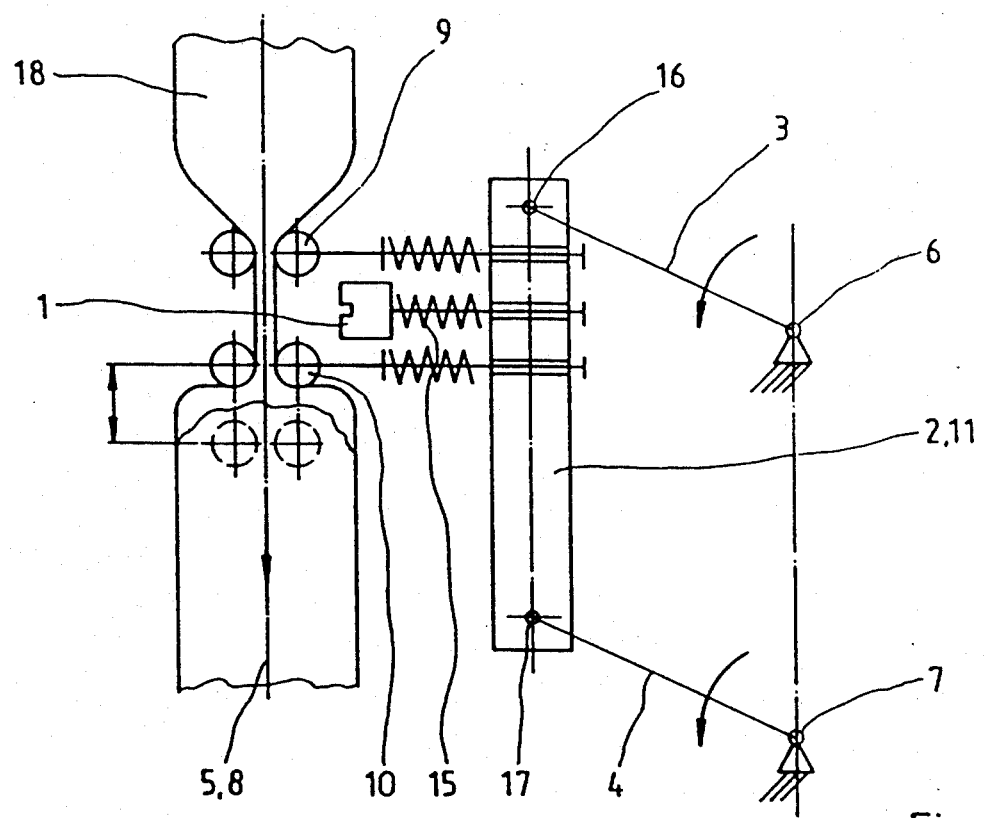
FIG. 2 is an enlarged, schematic partial view of the welding jaw and of the support.

FIG. 2 illustrates in detail again the design of the arrangement schematically illustrated in FIG. 1 and shows in particular that the swivel axles 6, 7 are stationarily supported.

FIG. 2 illustrates furthermore schematically a tubular bag 18, which is sealed by means of the cross-sealing jaw 1. FIG. 2 shows that an upper and a lower closing and removing element 9, 10 can also be supported on the support 2, which element is also movable relative to the support 2 and can be initially tensioned by means of springs. Thus, it is possible by means of the closing and removing element to stretch and align the material of the tubular bag 18 in a conventional manner prior to or while the cross-sealing jaw carries out the welding operation. It is thereby in particular possible according to the invention to select the relative speeds through a suitable adjustment of the speed of movement of the tubular bag 18 and of the speed of rotation of the cross-sealing jaw arrangement such that either no relative speed exists between the cross-sealing jaw and the tubular-bag material or that prior to the actual start of the welding operation by means of a relative movement, a removing effect is caused by the closing and removing elements 9, 10.

Figure 3:
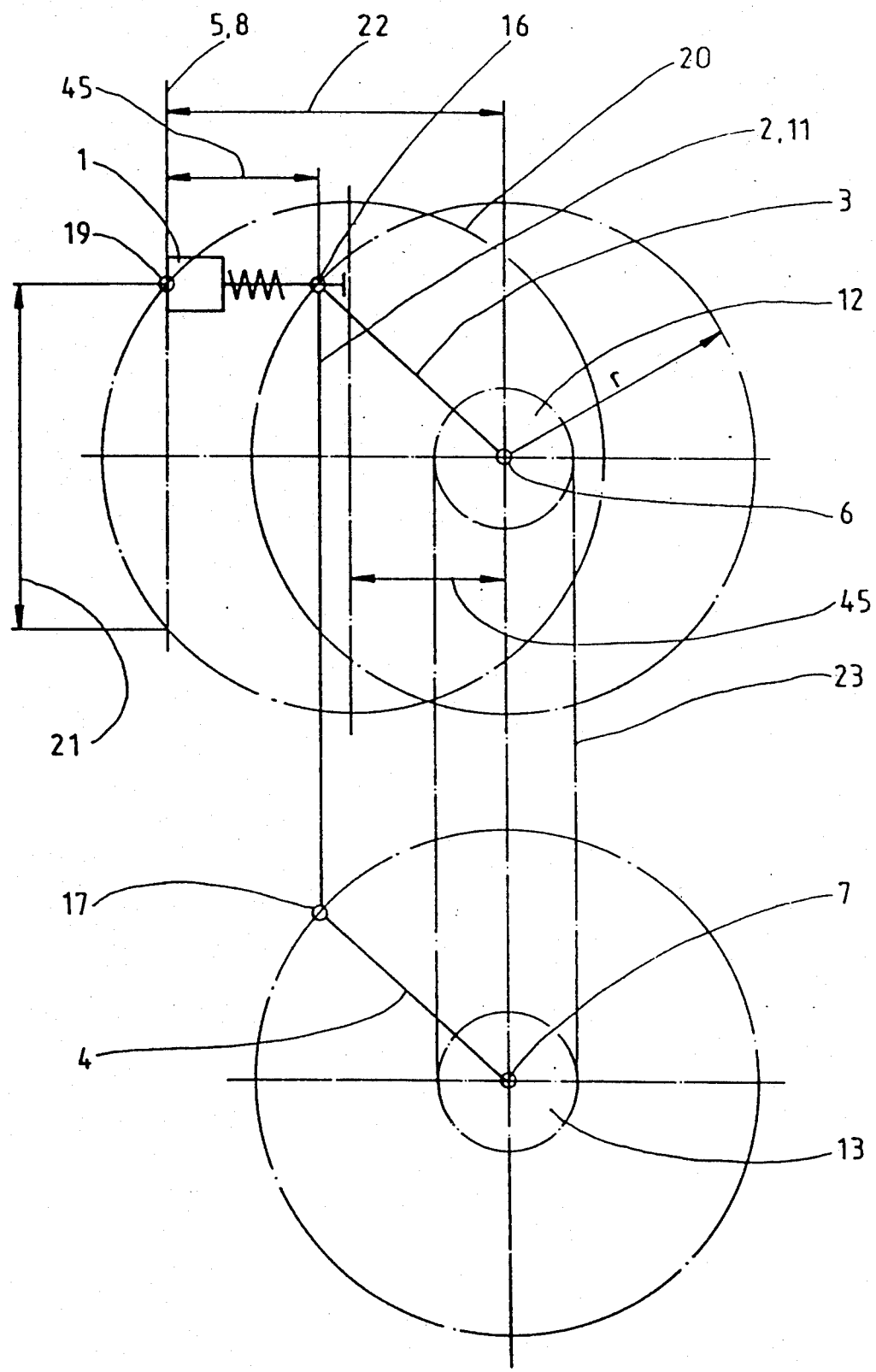
FIG. 3 is a further schematic side view of the four-bar mechanism of the invention.

FIG. 3 shows again an enlarged detailed illustration of the arrangement, from which results in particular the circular path 20 of the front contact point 19 of the cross-sealing jaw 1. From the illustration according to FIG. 3 can be seen furthermore how long the welding path 21 is, namely, over which path the cross-sealing jaw 1, caused by its movable support on the support 2, is guided on the center plane 8 or rather on the centerline 5. Furthermore, FIG. 3 shows that through a simple change in the distance 22 between the centerline 5 or rather the center plane 8 and the plane extending through the axles 6, 7 or through a change in the distance 45 between the surface of the cross-sealing jaw (point 19) and the fulcrums (16, 17), the welding path 21 can be varied so that an especially simple adjusting of the apparatus to different operating conditions is guaranteed. FIG. 3 shows furthermore that the two parallel guide-bar arrangements 3, 4 are each connected to a crank disk 12, 13 or rather a similar element, with the crank disks 12, 13 being coupled through a drive 23 with one another such that the same angular speeds result.

Figure 6:
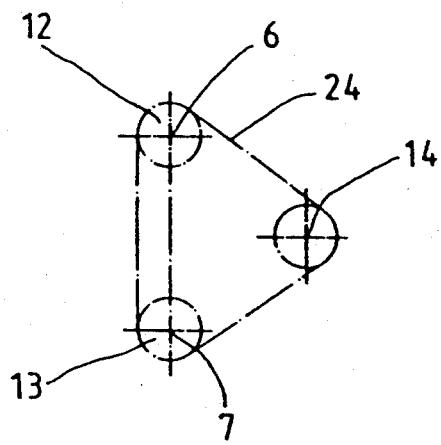
FIG. 6 is a schematic side view of a further embodiment of a drive arrangement according to the invention, and, FIG. 7 are schematic side views of different drive arrangements.
Figure 7:
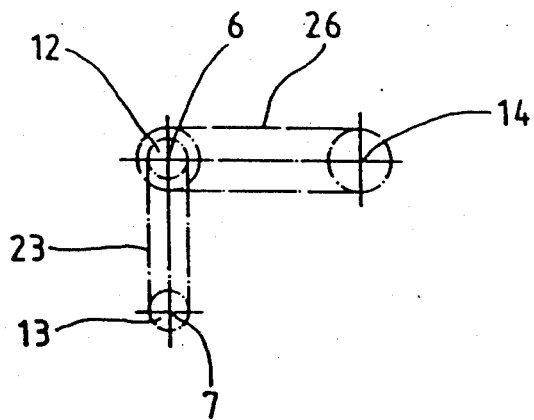

FIG. 4 shows again a schematic side view of the arrangement of the invention, from which results the drive of the crank disks 12, 13. It is possible to connect by means of a rotating drive 24, for example, a chain or a toothed belt, a drive axle 14 directly to both the upper crank disk 12 and also the lower crank disk 13. FIGS. 6 and 7 show as an alternative to these drives that all modifications assure that the same angular speeds about the axles 6, 7 result.

Figure 4:
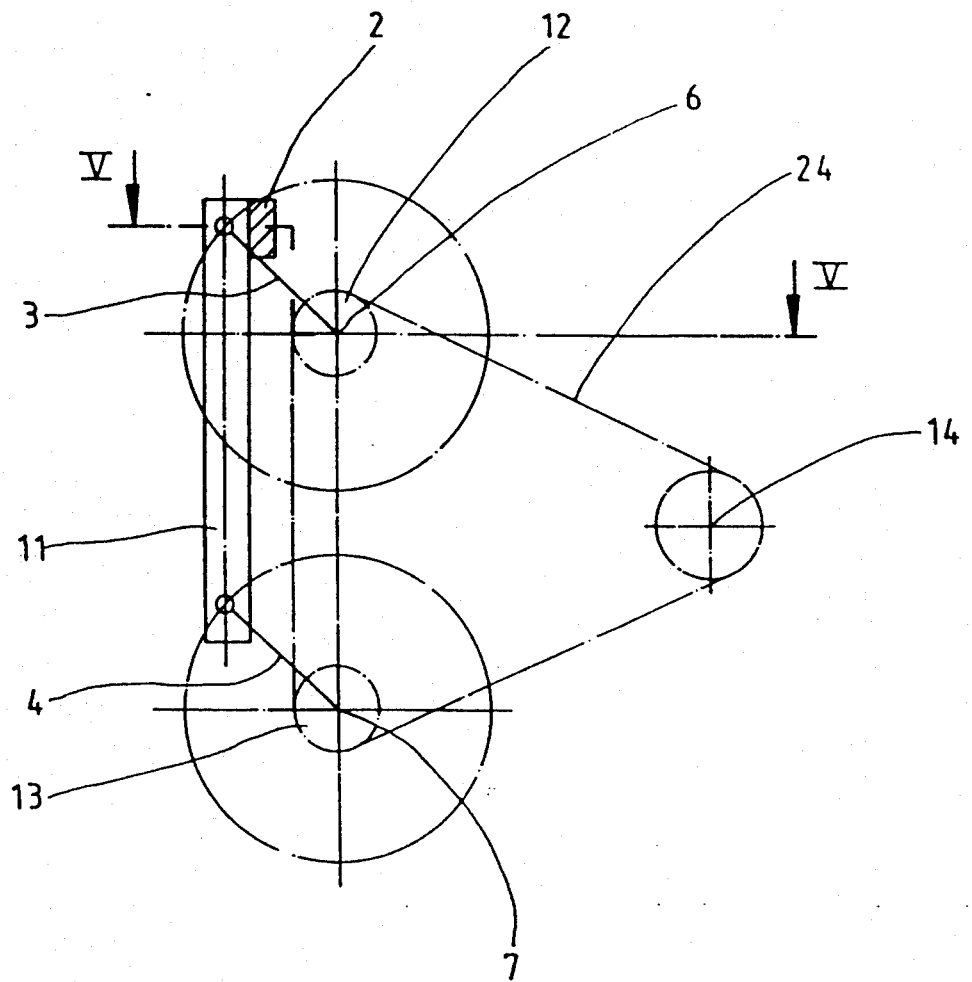
FIG. 4 is a further schematic side view of the four-bar mechanism.
Figure 5:
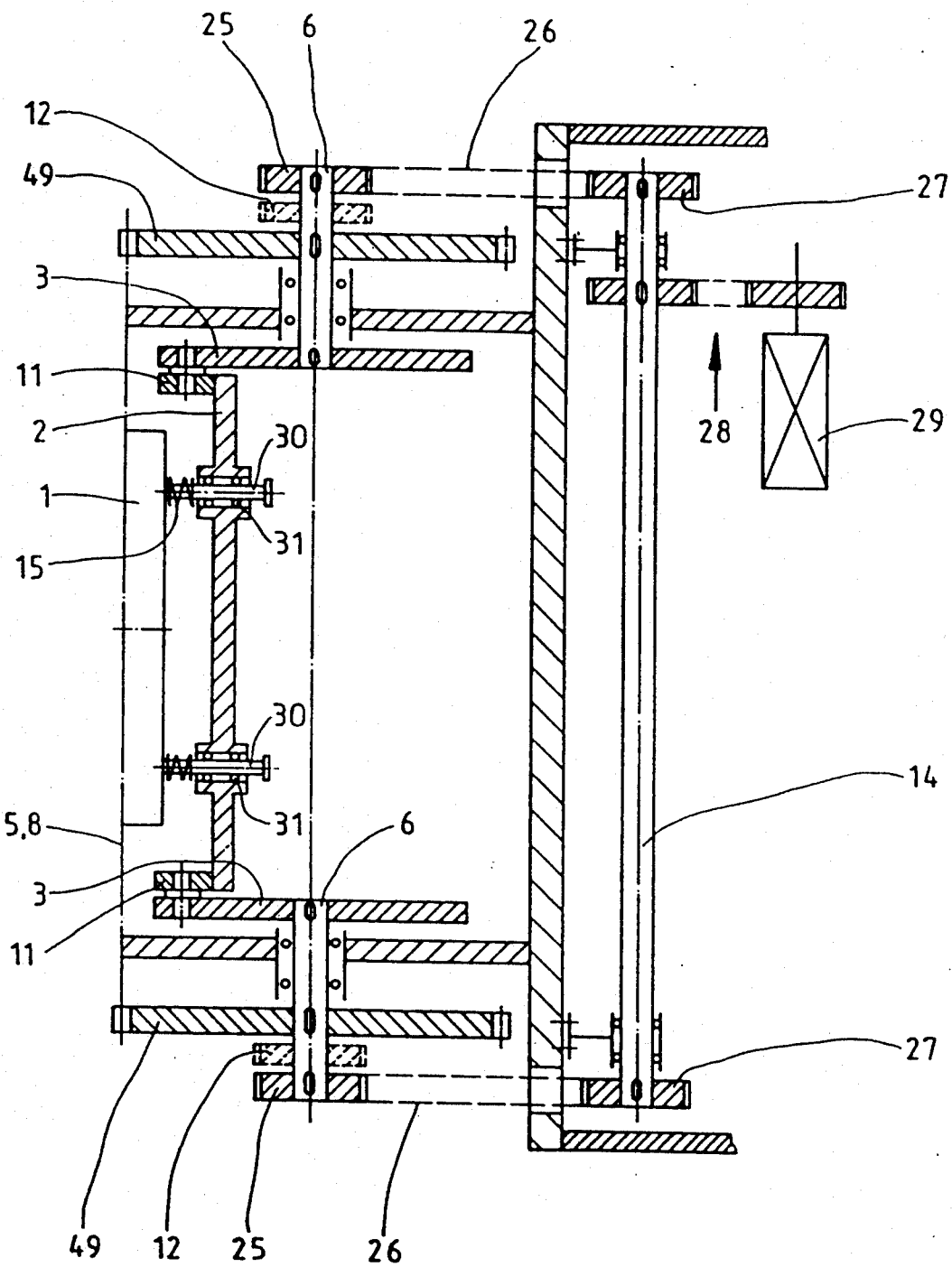
FIG. 5 is a schematic cross-sectional view taken along the line V—V of FIG. 4.

FIG. 5 shows schematically a possible technical embodiment, which is partly already shown in FIG. 4. The support 2 is thereby constructed in the form of a narrow beam and is connected to connecting guide bars 11, which in turn are operatively connected to the lower parallel guide-bar arrangement 4. As is shown in FIG. 5, the connecting guide bars 11 are mounted on the ends of the support 2. The connecting guide bars 11 are, as this can also be seen in FIG. 5, connected to the respective crank disks 12 (or 13) by the suitable parallel guide-bar arrangements 3, 4 so that these can be rotated about the axles 6, 7. The housing and the respective supports will not be described in detail because the man skilled in the art is familiar with those based on his technical knowledge. One toothed-belt or chain sprocket 25 is fastened to each of the free ends of the axles 6, 7, which toothed-belt or chain sprocket is connected to a further toothed-belt or chain sprocket 27 by a toothed-belt or chain 26 or a similar drive element, which sprocket 27 in turn is supported on the drive axle 14. The drive takes place through a further in between gearing 28 and a drive motor 29. The gears 49 transfer the respective rotary movement onto the oppositely lying four-joint mechanism (not illustrated here) with the opposed cross-sealing jaw(s).

The movable support of the cross-sealing jaw 1 on the support 2 is realized by fastening bolts 30 to the cross-sealing jaw 1, which bolts are each movably supported in a guideway 31 on the support 2. The initial tension of the cross-sealing jaw 1 is done through the already described spring 15.

Figure 8:
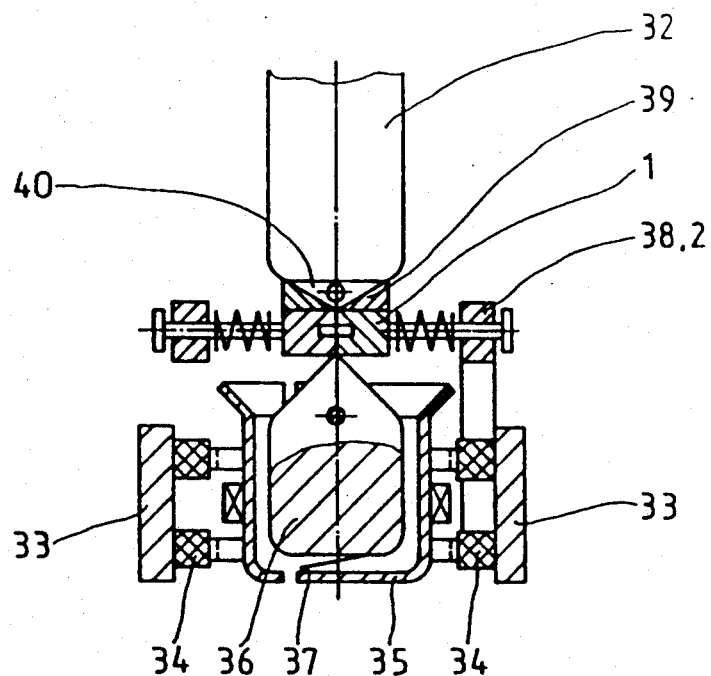
FIG. 8 is a schematic front view of a block-base device.
Figure 9:
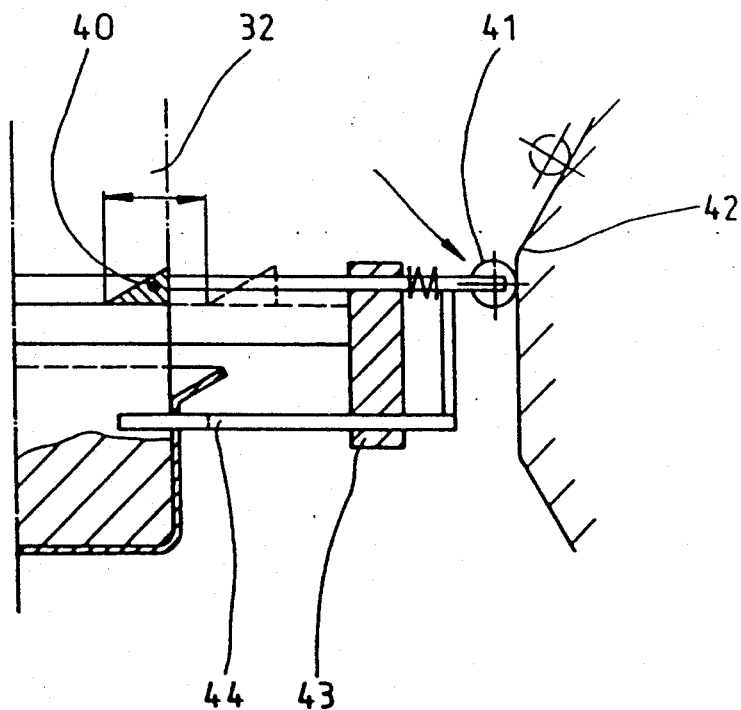
FIG. 9 is a side view of the arrangement shown in FIG. 8.

FIGS. 8 and 9 illustrate detailed views of the block-base device to be used according to the invention. Reference numeral 32 identifies the tubular foil in FIGS. 8 and 9. A mounting plate 33 exists below or rather at the lower end of the device, on which mounting plate 33 are mounted buffers 34. A cage 35 is supported above the buffers 34, which cage is used to receive the block-base bag 36. The illustration according to FIG. 8 shows the turned bottom seam 37. The device has furthermore in a conventional manner upper jaw carriers 38 which correspond with the supports 2 according to the above-described exemplary embodiments. The cross-sealing jaws 1 are supported on the supports 2. An air cooling system 39 and a block-base pin 40, which is also shown in the side view of FIG. 9, exists furthermore above the cross-sealing jaws 1. The drive is done through a guide roller 41, which runs on a cam 42. A side-folding rod 44 is, aside from the block-base pin 40, also supported on a holder 43. The side-folding rod 44 is used to create in a conventional manner a side fold. The block-base device corresponds to the known state of the art and its operation does therefore not need to be described in detail. It is important according to the invention that the device, due to the low structural height of the cross-sealing station and the arrangement of the cross-sealing jaws, can be inserted in known machines below the machines.

Figure 10:
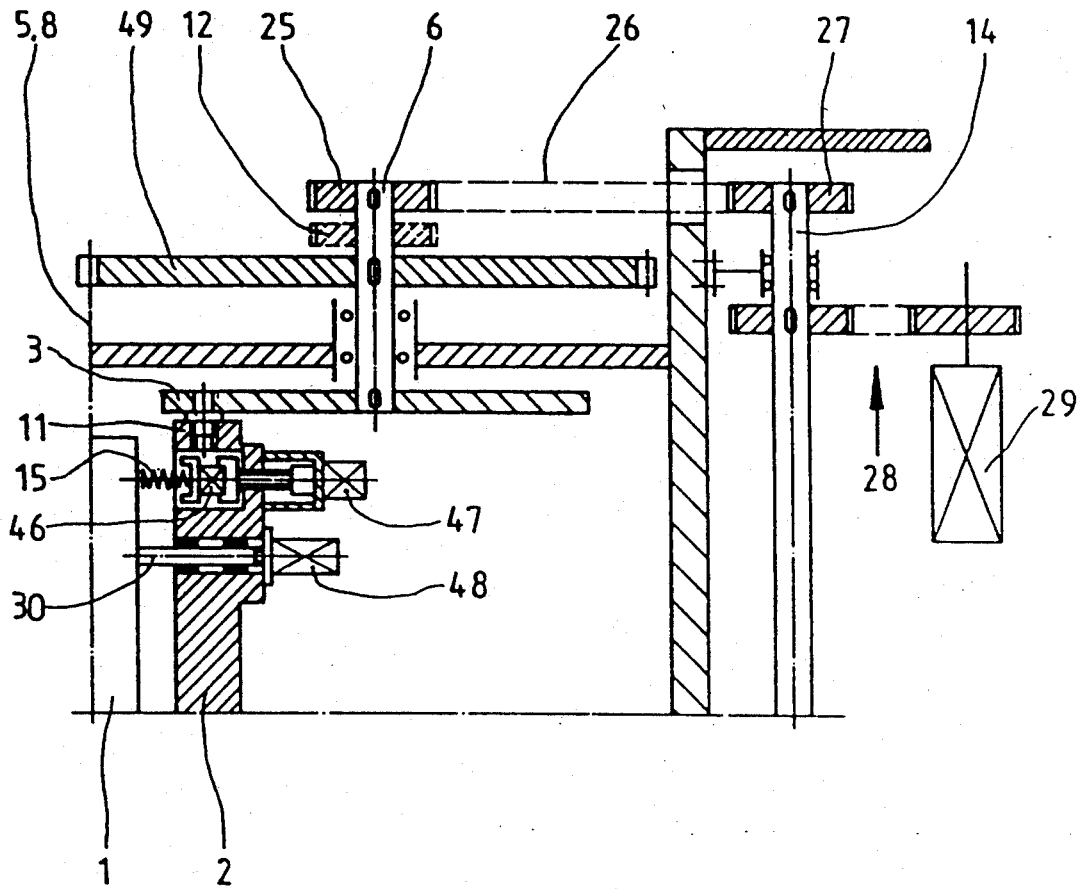
FIG. 10 is a cross-sectional view corresponding with FIG. 5, however, with a pressure-measuring sensor and a motor-driven jaw-adjusting device.

FIG. 10 illustrates schematically an expanded embodiment of the design of FIG. 5. The sealing pressure is here adjusted and measured with the help of a measuring sensor 46, 47 having both a sensor 46 and a drive 47 to adjust the pressure. The welding path 21 is furthermore adjusted by the drive 48. With this design, it is possible to achieve an automatic sealing-pressure and sealing-path adjustment.

Figure 11:
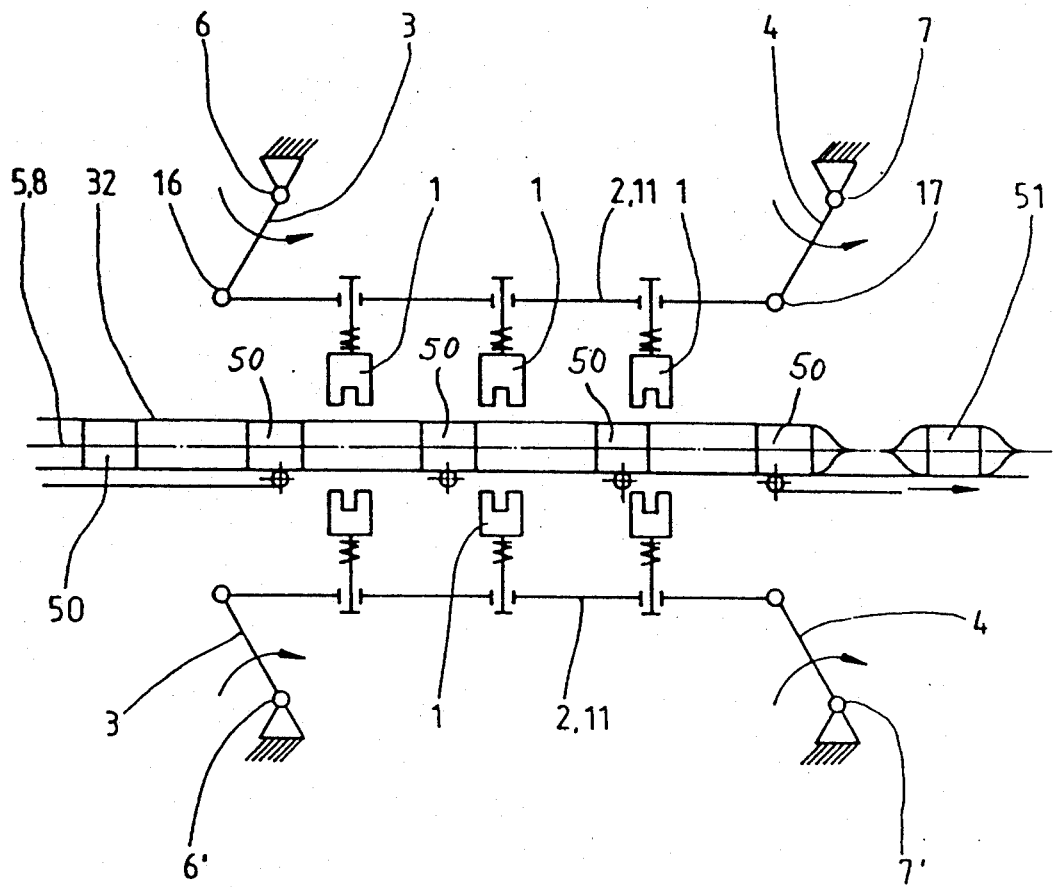
FIG. 11 is a schematic side view of a further embodiment according to the invention for horizontal tubular bag machines.

FIG. 11 illustrates the use of an apparatus of the invention in a horizontally operating packaging machine. It is advantageous here to arrange several pairs of cross-sealing jaws 1 one behind the other, thus significantly increasing the output. The foil 32 envelopes the product 50 to be packaged and already arranged in defined intervals. The foil is first longitudinally welded to form a tube and is thereafter cross-welded by means of cross-sealing jaws 1. The packaged bags 51 are continuously discharged. Thus, the operation corresponds with the vertical design, with the difference that the connecting guide bars 11 are here also horizontally arranged.

The invention is not to be limited to the illustrated exemplary embodiments, rather many possibilities for modifications within the scope of the invention result for the man skilled in the art.

The embodiment of the invention in which an exclusive property or privilege is claimed are defined as follows:

1. In an apparatus for the forming, filling and closing of bags made from a heat-sealable sheet utilizing means for forming a tube out of said sheet, a filling mechanism and a cross-sealing station, which includes at least two cyclically movable cross-sealing jaw means arranged on opposite sides of a vertically extending central axis on the apparatus for the tube, the improvement wherein each cross-sealing jaw means includes a pair of vertically spaced, synchronously driven, rotary drive members rotatable about vertically spaced and parallel axes, each rotary drive member having a connection means thereon spaced radially outwardly from said axes therefor, a support member connected to and extending between said connecting means on each said rotary drive member, the theoretical lines extending between (1) said spaced and parallel axies, (2) each of said axes and a respective one of said connection means, and (3) each connection means, defining a parallelogram, the thoretical line extending between said connection means always remaining parallel to the theoretical line extending between said axes and said central axis of the tube, and wherein each cross-sealing jaw means further includes a cross-sealing jaw reciprocally movably supported on said support member for horizontal movement in a direction that is always perpendicular to said theoretical line extending between said spaced and parallel axes, and wherein resilient means is provided on said support member for elastically yieldably urging said cross-sealing jaw reciprocally movably supported on said support member for horizontal movement in a direction that is always perpendicular to said theoretical line extending between said spaced and parallel axes, and wherein resilient means is provided on said support member for elastically yieldably urging said cross-sealing jaw in said direction perpendicular to said theoretical line extending between said spaced and parallel axes toward said central axis of the tube so that when said cross-sealing jaw of each cross-sealing jaw means engages the tube on opposite sides of said central axis of the tube, said resilient means will yield as a space between said central axes and said support member decreases while effectively clamping said tube therebetween to facilitate the forming of a cross seal in the tube.

2. The apparatus according to claim 1, wherein the cross-sealing jaw is supported substantially centrally on said support member and wherein on both sides of the cross-sealing jaw there are reciprocally, movably arranged, in a direction parallel to the direction of movement of said cross-sealing jaw, closing and removign elements on said support member.

3. The apparatus according to claim 2, wherein said closing and removing elements include a further resilient means for elastically yieldably urging said closing and removing elements toward said central axis of the tube so that when said closing and removign elements engages the tube on opposite sides of said central axis of the tube, said further resilient means will yield as said space between said central axis and said support member decreases.

4. The apparatus according to claim 1, wherein each said rotary drive member is defined by at least one of an elongated crank arm and a crank disk.

5. The apparatus according to claim 4, wherein said at least oen of said crank arms and said crank disks are operatively connected to a common drive axle.

6. The apparatus according to claim 4, wherein said at least one of said crank arms and said crank disks of one rotary drive member is operatively connected to a drive axle and to at least one of said crank arms and said crank disks of the other rotary drive member.

7. The apparatus according to claim 4, wherein each of said rotary drive members are crank disks, and wherein said crank disks are driven at the same angular speed.

8. The apparatus according to claim 1, wherein said support member is moved in a sinusoidal movement perpendicularly with respect to the theoretical line extending between said axes of said rotary drive members.

9. The apparatus according to claim 1, wherein a length of a path during which said cross-sealing jaws clamp said tube therebetween is adjustable by changing said spacing of said axes from said central axis.

10. The apparatus according to claim 1, wherein the cross-sealing station is followed by a block-base station.

11. The apparatus according to claim 1, wherein a measuring sensor is oriented between said cross-sealing jaw and said support member to determine a clamping pressure of said cross-sealing jaws on said tube.

12. The apparatus according to claim 1, wherein said cross-sealing jaw means includes an adjusting means for adjusting a position of said cross-sealing jaw relative to said support member.

13. The apparatus according to claim 12, wherein said adjusting means also effects an adjusting of a clamping pressure of said cross-sealing jaws on said tube.

14. The apparatus according to claim 1, wherein a length of a path during which said cross-sealing jaws clamp said tube therebetween is adjustable by changing a spacing between said axes from said support member.

* * * * *

UNITED STATES PATENT AND TRADEMARK OFFICE
CERTIFICATE OF CORRECTION

PATENT NO. : 5,191,750
DATED : March 9, 1993
INVENTOR(S) : Roman KAMMLER It is certified that error appears in the above-identified patent and that said Letters Patent is hereby corrected as shown below:

```
Column 7, line 19; change "axies" to ---axes---.
          line 21; delete "thoreti-".
          line 22; change "cal" to ---theoretical---.
          line 33; delete "reciprocally movably supported on
                   said support".
          line 34: delete in its entirety.
          line 35; delete in its entirety.
          line 36; delete in its entirety.
          line 37; delete in its entirety.
          line 38; delete "elastically yieldably urging said
                   cross-sealing jaw".
Column 8, line  1; change "removign" to ---removing---.
          line  7; change "removign" to ---removing---.
          line 16; change "oen" to ---one---.
```

Signed and Sealed this

Sixteenth Day of November, 1993

*Attest:*

BRUCE LEHMAN

*Attesting Officer*     *Commissioner of Patents and Trademarks*